United States Patent
Deaton

(10) Patent No.: US 9,839,088 B1
(45) Date of Patent: Dec. 5, 2017

(54) SECURITY LIGHT WITH REMOTE PHOTO-VOLTAIC MODULE AND BATTERY BACKUP AND RELATED METHODS

(71) Applicant: HeathCo LLC, Bowling Green, KY (US)

(72) Inventor: John Colvin Deaton, Bowling Green, KY (US)

(73) Assignee: HeathCo, LLC, Bowling Green, KY (US)

(*) Notice: Subject to any disclaimer, the term of this patent is extended or adjusted under 35 U.S.C. 154(b) by 0 days.

(21) Appl. No.: 15/455,827

(22) Filed: Mar. 10, 2017

Related U.S. Application Data

(60) Provisional application No. 62/306,245, filed on Mar. 10, 2016.

(51) Int. Cl.
*H05B 37/02* (2006.01)
*H05B 33/08* (2006.01)
(Continued)

(52) U.S. Cl.
CPC .......... *H05B 33/0854* (2013.01); *F21S 9/022* (2013.01); *F21S 9/032* (2013.01);
(Continued)

(58) Field of Classification Search
CPC ............ H05B 33/0815; H05B 33/0818; H05B 41/2828; H05B 41/3921; H05B 41/3927;
(Continued)

(56) References Cited

U.S. PATENT DOCUMENTS 1,881,594 A   10/1932   Hotchkin
3,193,229 A   7/1965    Stock
(Continued)

FOREIGN PATENT DOCUMENTS

BR   9805481   8/2000
CH   611446    5/1979
(Continued)

OTHER PUBLICATIONS

US 5,387,858, 2/1995, Bender et al. (withdrawn).
(Continued)

*Primary Examiner* — Minh D A
(74) *Attorney, Agent, or Firm* — Middelton Reutlinger

(57) ABSTRACT

Methods and apparatus for a security light having a remote photovoltaic module is set forth. The security light includes a primary rechargeable battery connected to the remote photovoltaic module while also having a backup battery system to be utilized when the rechargeable batteries condition require recharge. The security lighting unit functions as a security light to provide variable wide area illumination based upon environmental and battery conditions and also which power supply is optionally connected to the load, the load being the illumination sources and the various supportive electronics. The system further includes a controller which can not only operationally selects either the rechargeable batteries or backup batteries but also can monitor battery condition to preserve battery life. In operation, the security light may include a variable battery power supply for ease of installation.

20 Claims, 11 Drawing Sheets

(51) Int. Cl.
*F21S 9/02* (2006.01)
*F21S 9/03* (2006.01)
*H02J 9/00* (2006.01)
*H02J 9/06* (2006.01)
*H02J 7/35* (2006.01)
*F21Y 115/10* (2016.01)
*F21W 131/10* (2006.01)

(52) U.S. Cl.
CPC ............. *H02J 7/35* (2013.01); *H02J 9/005* (2013.01); *H02J 9/06* (2013.01); *H05B 33/0848* (2013.01); *H05B 33/0887* (2013.01); *F21W 2131/10* (2013.01); *F21Y 2115/10* (2016.08)

(58) Field of Classification Search
CPC .... H05B 37/0272; H05B 41/00; H05B 41/36; H01J 61/52; H01J 65/044; H01J 61/523; F21K 9/00; F21V 29/004; G09G 3/22; G09G 2320/0233
USPC ........................................................ 315/291
See application file for complete search history.

(56) References Cited

U.S. PATENT DOCUMENTS

| | | |
|---|---|---|
| 3,531,636 A | 9/1970 | Birch |
| 3,762,082 A | 10/1973 | Mincy |
| 4,667,142 A | 5/1987 | Butler |
| 4,823,241 A | 4/1989 | Trattner |
| 4,890,093 A | 12/1989 | Allison et al. |
| 5,055,984 A | 10/1991 | Hung et al. |
| 5,149,188 A | 9/1992 | Robbins |
| 5,410,458 A | 4/1995 | Bell |
| 5,813,749 A | 9/1998 | Sheldon |
| 6,060,658 A | 5/2000 | Yoshida et al. |
| 6,152,582 A | 11/2000 | Klaus |
| 6,280,053 B1 | 8/2001 | Chien |
| 6,517,217 B1 | 2/2003 | Liao |
| 6,522,263 B2 | 2/2003 | Jones |
| 6,686,701 B1 | 2/2004 | Fullarton |
| D494,536 S | 8/2004 | Pu |
| 6,830,058 B2 | 12/2004 | Li |
| 6,851,823 B2 | 2/2005 | Bilotti |
| 6,948,826 B2 | 9/2005 | Fogerlie |
| 6,964,498 B2 | 11/2005 | Wu |
| 7,891,832 B2 | 2/2011 | Allsop et al. |
| 8,384,556 B2 * | 2/2013 | Ko ............... G08B 13/19 340/332 |
| 8,621,245 B2 * | 12/2013 | Shearer .......... G06K 19/0707 340/539.26 |
| 8,810,191 B2 | 8/2014 | Maldonado |
| 8,884,531 B1 | 11/2014 | Xu |
| 9,078,313 B2 | 7/2015 | Recker et al. |
| 2003/0098976 A1 | 5/2003 | Yamauchi |
| 2005/0083681 A1 | 4/2005 | Yeh |
| 2005/0146874 A1 | 7/2005 | Cech et al. |
| 2005/0248934 A1 | 11/2005 | Weiser et al. |
| 2006/0012978 A1 | 1/2006 | Allsop et al. |
| 2006/0139912 A1 | 6/2006 | Norton et al. |
| 2006/0227542 A1 | 10/2006 | Richmond |
| 2007/0159836 A1 | 7/2007 | Huang et al. |
| 2011/0304273 A1 | 12/2011 | Bennette |

FOREIGN PATENT DOCUMENTS

| | | |
|---|---|---|
| DE | 3635209 | 4/1988 |
| EP | 386811 | 9/1990 |
| EP | 1291834 | 3/2003 |
| EP | 1500870 | 1/2005 |
| JP | 11318218 | 11/1999 |
| JP | 2001230433 | 8/2001 |

OTHER PUBLICATIONS

Silicon Solar, Solar-powered LED security spotlight—Model No. 44311, 2010, China.

Ballar et al., Sun-Tracking Solar-Powered LED Street Light, California Polytechnic State University, Jun. 2015, US.

\* cited by examiner

SECURITY LIGHT WITH REMOTE PHOTO-VOLTAIC MODULE AND BATTERY BACKUP AND RELATED METHODS

TECHNICAL FIELD

The present invention is directed generally to a security lighting unit having a remote photo-voltaic module used with a rechargeable battery and also having battery backup. More particularly, various inventive methods and apparatus disclosed herein relate to providing security lighting without line voltage by using a rechargeable power source.

BACKGROUND

Outdoor security lighting is commonplace in use for both residential and commercial environments. Typically, such security lighting systems are directly connected to a wired power source and function to illuminate large areas after detection of movement utilizing proximity and/or motion sensors. These security lighting systems typically have high wattage illumination capabilities and function to provide low level lighting for a period of time after dusk and high level lighting upon detection of movement by the motion/proximity sensors. Such dual-bright security illumination with motion sensors can be found and described in various patents such as U.S. Pat. Nos. 5,282,118; 5,434,764; 5,590,953; 5,598,966; 5,757,004 and 6,323,488 all of which are incorporated herein by reference.

In most of these systems however, due to the high level of output illumination required for adequate security lighting, direct line voltage is required to power the illumination source along with the security lighting controller which directs lighting levels, receives sensor input and the like. It may be difficult and/or expensive however in some locations to provide such line voltage and thus desirable to have an adequate rechargeable power supply with a battery backup so that no external power source is required at the security light.

Thus, there is a need in the art to provide methods and apparatus that provide a rechargeable battery source and means for recharging as well as battery backup for a security lighting system not directly connected to line voltage source and that optionally overcome one or more drawbacks of existing security lighting apparatus and/or control methods.

SUMMARY

The present disclosure is directed to a security light having a remote photo-voltaic module ("PVM") and battery backup and related methods as well as an associated security lighting control. More particularly, various inventive methods and apparatus disclosed herein relate to providing a security lighting apparatus that has a remotely placeable PVM for electrical connection to rechargeable batteries which supply power to the security light. As well, the various inventive methods and apparatus disclosed herein further relate to an associated battery backup system for the security light such that when the rechargeable batteries are at a predetermined and specified voltage or condition, the backup batteries provide power to the illumination sources. Further, the various inventive methods and apparatus disclosed herein provide for a remote PVM which may be placed separately from the security light in order to increase exposure to sunlight but which operates to provide a power source to the rechargeable battery system.

The security light described herein sets forth a security illumination device which is readily installable without requiring installation into standard electrical connectivity to an electrical network. The security light includes a stand-alone power supply which includes both a rechargeable battery, a backup battery system and a remote PVM to recharge primary rechargeable battery. The security light can function to illuminate a wide area at a first illumination level when motion is detected if the load is connected to the rechargeable battery and optionally a second illumination level when motion is detected if the load is connected to the backup battery.

The present disclosure is further directed towards a security light with a rechargeable battery system and backup battery system which utilizes an LED illumination source due to the reduced power consumption of such illumination devices. The LEDs may be controlled by a security lighting controller which may be operable to monitor voltage levels of the rechargeable batteries so that the backup battery system may be utilized while the rechargeable batteries are recharged. The controller may further monitor the backup battery system voltage level in order to verify condition and usage and to lessen the demand on the backup battery system by lowering the illumination level of the illumination source/LEDs.

The present disclosure is further directed to a security light controller which further monitors temperature and/or other environmental conditions in order to limit the load on either the backup battery system or the rechargeable battery system by adjusting the duty cycle of the output current to the illumination sources/LEDs when conditions exist such that use would degrade either power source. For example, in various environmental conditions such as extreme cold weather, the security light controller may modulate the output of the current to lower levels in order to protect battery life such as between 0 and −10 Celsius. Even lower levels of current output through modulation may be provided at colder temperatures such as between −10 and −20 Celsius. Even further, as an example, complete discontinuation of battery discharge may be effected to additionally protect battery life. Alternatively, various environmental conditions could be defined to restrict charging of the rechargeable batteries.

As is further described in the various disclosures herein, the ability to position the remote PVM for increased exposure to sunlight in order to maximize photovoltaic power output is of import to security lighting as many security lighting systems will be mounted below eaves or roof lines of buildings thereby limiting their direct exposure to sunlight. Thus, providing a remote PVM acts to increase the power capacity of the rechargeable battery system and the length of operability the security light may have without direct connection to external line voltage.

In various implementations, the security light having a remote photo-voltaic module ("PVM") and battery backup and related methods disclosed herein may also optionally increase illumination levels from a first reduced intensity (in some embodiments a lower level) light output to an second increased intensity (in some embodiments a higher level) light output based on detected proximity or movement of an individual, object or other triggering event. Providing reduced intensity light output from the light sources based on the lack of detected movement may lengthen battery life while still providing general low level illumination. Upon detection of movement by the proximity/movement detectors, for example, the security light controller may increase the lighting level to the second increased intensity for a user defined period.

Alternatively, in some implementations, the security light may a first variable light intensity output or a second variable light intensity output upon detection of motion or proximity to the unit. Hence, the security light may provide wide area illumination upon detection of motion or proximity of a person or object and the wide area illumination may be variable depending on the power source currently supporting the load. For example, if the rechargeable battery system is presently electrically connected to the load, the security light, upon detection of motion, may begin illumination at a first intensity output from the illumination sources, such as for example 600 lumens. Alternatively, if the backup battery system is electrically connected to the load, upon detection of motion, the security light may initiate illumination at a second lower intensity output from the illumination sources, such as for example 200 lumens. Even further, should the security light detect certain environmental conditions such as lower temperatures, for example and as is described further herein, even further reduced lumen output may be may be initiated by the controller.

As one example, in some embodiments a security light is provided with a light source, a remote PVM, a security light controller, light sensor, rechargeable and non-rechargeable batteries and a motion/proximity sensor. The security light controller controls the light output of the light source and/or additional light source(s) based upon detection of signals from the motion/proximity sensor as well as other sensor input, such a light sensor. The security light controller may as well control the discharge rate of the rechargeable batteries as well as the non-rechargeable batteries based upon various inputs, for example, such as voltage levels, temperature levels, motion sensor output, etc. By controlling discharge rate, charging rate and monitoring environmental conditions and the like, the security light controller can maximize the charge life of the rechargeable batteries, the life of the non-rechargeable batteries and improve the overall functionality of the security light with a rechargeable battery system.

The security light controller, in various aspects, may further monitor the voltage level of both the rechargeable batteries and the non-rechargeable batteries. Based upon predefined conditions, such as for example the voltage level of the rechargeable battery being below a predefined limit of about 3.4V, the security light controller may switch the power source for the illumination/light source from the rechargeable batteries to the backup battery system. Alternatively, in another aspect, if the security light controller detects the voltage of the rechargeable batteries at or above a predefined recharge limit, say for example 3.8V, for a predetermined period of time, the security light controller may switch the power source back to the rechargeable batteries. Further, in another aspect, if the security light controller detects the rechargeable batteries at or above a predefined recharge limit, say for example 4.1V, the security light controller may switch the power source back to the rechargeable batteries from the backup battery system.

In another aspect, during standard operation wherein the rechargeable batteries are powering the LEDs/illumination sources, the security light controller may verify continued recharge condition of the batteries. For example, if the recharge batteries are above a predefined upper limit, say 4.2V, the remote PVM may be disconnected from the charging circuit and hence discontinue charging the rechargeable battery. Alternatively, if the recharge batteries are below a lower limit, say 3.4V, the rechargeable batteries may be disconnected from the power supply circuit powering the illumination sources and be allowed to recharge. Further, in other aspects, if the security light controller detects the backup batteries being below a predefined lower voltage of a lower threshold, say for example 3V, the backup batteries may also be disconnected from the power supply circuit to prevent complete discharge of the backup batteries while also providing the user an indication of a low battery voltage condition.

Other embodiments may include a non-transitory computer readable storage medium storing instructions executable by a processor to perform a method such as one or more of the methods and/or process steps described herein. Yet other embodiments may include a system including memory and one or more processors operable to execute instructions, stored in the memory, to perform a method such as one or more of the methods described herein. Other embodiments may combine some or all of the functionality of the security light processor with instructions, stored in memory and accessible by the processor to implement the various features disclosed herein. Such features may be combined with either instructions operable within the controller to execute and implement such functions, electronics to implement such functions or a combination of both.

Generally, in another aspect, a security light with remotely placeable PVM is provided that includes a main housing having at least one lamp head, the at least one lamp head having a plurality of LEDs as illumination sources. The security light further includes a security light controller which is connected electrically to a power supply circuit, the power supply circuit operationally connected to either a rechargeable battery or optionally to a non-rechargeable backup battery. The housing further is connected to a motion detection system including, for example, at least one PIR for detection of motion and/or proximity of an object as well as other sensors and control electronics, such as an temperature sensor or light detector, to allow the security light to detect the level of environmental light currently existing and prevent the illumination sources from being energized during the daytime or at given temperatures. Even further and in various further embodiments, the controller may allow the illumination sources to be maintained at lower intensity levels for user selected time periods while similarly allowing the security light to be maintained at higher intensity levels for user selected time periods. The security light controller may further be operable to select between the rechargeable battery system or the backup battery system depending on the current battery condition and environmental conditions. The remotely placeable PVM is electrically connected to the rechargeable backup system to provide power from photovoltaic cells and is separately placeable to maximize exposure to sunlight and may be angled accordingly.

In various aspects the security light controller further is operable to detect the condition of the rechargeable battery system and also ambient environmental conditions to appropriately switch between the rechargeable battery system and the backup battery system, control recharging and connect and/or disconnect the rechargeable batteries from the remote PVM.

In further aspects, the security light controller will detect and monitor the present battery voltage and temperature and appropriately select recharging status of the rechargeable battery system, illumination intensity output of the LEDs or other illumination sources, power supply connectivity and the like.

In some aspects the illumination source is an LED and the security light controller includes an LED driver. In various aspects, the LEDs are positioned on a single or a plurality of directional lamp heads. In other aspects, the security light controller can energize all or segmented ones of the LEDs in each of the security light lamp heads. In further aspects, the security light controller can modulate the light to vary the illumination level output of the LEDs and otherwise modify light output.

The security light controller may be operable to implement various techniques to extend battery life while monitoring both load on the battery and also required light output. In further aspects, these techniques include reducing illumination level of the rechargeable batteries when certain input conditions exists such as battery voltage level. In other aspects, battery life may be extended while taking into consideration external and environmental conditions such as temperature among others.

In some embodiments the security light controller adjusts the lighting control output to control the light output of the illumination/light source based on the various inputs, including voltage inputs of the batteries connected to a power supply circuit and/or in communication with the controller. The power supply circuit may optionally select between the rechargeable battery system or the backup battery system and may optionally include a switch and be controlled by the security light controller. The security light controller may adjust the lighting output and illumination level through various digital lighting technologies. Digital lighting technologies, i.e. illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower power consumption, lower operating costs, and many others. Advances in LED technology have provided efficient and robust full-spectrum lighting sources that enable a variety of illumination in many applications. Some security lights embodying these illumination/light sources feature a lighting unit, including one or more LEDs capable of producing different output illumination levels and brightness through the use of pulse width modulation and other digital control techniques. Such implementations may also include a processor for independently controlling the output of the LEDs in order to generate a variety of illumination levels and possibly colors as well as other effects, for example, as discussed in detail in various prior art disclosures.

In various aspects disclosed herein, an outdoor security light with a remote photo-voltaic module is described including a security light housing having at least one adjustable lamp head, the lamp head including a plurality of LEDs, wherein the security light housing includes a control system, the control system having a security light controller. Further, the security light may have a motion sensor in communication with the security light controller, the motion sensor adjustably attached to the security light housing, the security light also having a rechargeable battery contained within the security light housing and in electrical connectivity with the security light controller. The light also may have a backup battery contained within the security light housing and in electrical connectivity with the security light controller and a remote photovoltaic module in electrical connection with the rechargeable battery and separately mountable from the security light housing.

The security light controller may, in various embodiments, be operably configured to optionally select connection between the rechargeable battery based upon a first input parameter and the controller may further be operably configured to electrically connect one of the rechargeable battery or the backup battery to the plurality of LEDs based upon the first input parameter.

In various aspects, the first input parameter may be a rechargeable battery voltage signal from the rechargeable battery. Further, the controller may be operably configured to monitor the first input parameter and disconnect the rechargeable battery from the remote photovoltaic module if it is above a predetermined upper threshold, say for example about 4.2V. The security light controller may further, in various aspects, be operably configured to monitor the first input parameter and connect the rechargeable battery from the remote photovoltaic module if it is below a predetermined first lower threshold of say for example 4.1V. The security light controller may also be, in aspects, operably configured to electrically connect the backup battery to the plurality of LEDs when the first input parameter is below a second lower threshold of for example 3.4 v. The security light controller may further be operably configured to disconnect the backup battery from the plurality of LEDs when a second input parameter is below a first lower threshold. The second input parameter may in various embodiments be a battery voltage signal from the backup battery and the lower threshold of the backup battery may be 3.0V. The security light controller may also optionally be configured to electrically connect the backup battery to the plurality of LEDs and reduce the intensity level of the plurality of LEDs as compared to a first intensity level when the plurality of LEDs are electrically connected to the backup battery or alternatively or in addition slowly reduce the intensity as the voltage diminishes. In some implementations, the security light controller may be operably configured to implement a staged reduction of a duty cycle of the plurality of LEDs as the second input parameter begins to lower. In other implementations, the outdoor security light controller may be operably configured to reduce a duty cycle of the plurality of LEDs as the first input parameter drops below a second input parameter. Still other implementations, the security light controller electrically connects the backup battery to the plurality of LEDs and reduces the intensity level of the plurality of LEDs as compared to a first intensity level when the plurality of LEDs are electrically connected to the backup battery.

In implementations, the present disclosure may include and describe an outdoor security light with a photo-voltaic module having a first and a second lamp head, the lamp head, each of the first and the second lamp head having a plurality of LEDs, the plurality of LEDs electrically connected to a security light controller; the security light controller in electrical connectivity with a motion detector, a rechargeable battery and a backup non-rechargeable backup battery; a photovoltaic module in electrical connectivity with the rechargeable battery and which is separately mountable; wherein the security light controller is operable to connect either the rechargeable battery or the non-rechargeable backup battery to the plurality of LEDs based upon a first input sensor value, the security light controller in electrical communication with a first input sensor to receive the first input sensor value; wherein the first input sensor value is based on the rechargeable battery; wherein the security light controller is in electrical communication with a second input sensor to receive a second input sensor value; wherein the security light controller modifies the duty cycle of the plurality of LEDs based upon either the first input sensor value or the second input sensor value.

In implementations, the security light may include a security light controller which is operable to electrically connect and electrically disconnect the rechargeable battery from the photovoltaic module based upon the first input sensor value. In others, the outdoor security light controller may further be in electrical communication with a third input sensor, the security light control operable to receive a third input sensor value from the third input sensor. In implementations, the third input sensor is based upon temperature. In embodiments, the security light controller may be operable to electrically connect and disconnect the rechargeable battery from the photovoltaic module based upon either the third input sensor value or the first input sensor value. In other embodiments, the security light controller modifies the duty cycle of the plurality of LEDs based upon either the first input sensor value, the second input sensor value or the third input sensor value.

In still other implementations, the description herein may include an outdoor security light with a remote photo-voltaic module, comprising: a first and a second lamp head, each of the first and the second lamp head moveable relative to a security light housing and having a plurality of LEDs; a motion detector; a remote photovoltaic module in removable connectivity with a rechargeable battery, the rechargeable battery maintained within the security light housing; a first sensor providing a first sensor value; a security light controller in controlling electrical connection with the plurality of LEDs and having one or more processors with an associated memory, the associated memory having instructions stored thereon to: read the first sensor value from the first sensor; adjustably connect the plurality of LEDs in the first and the second lamp head with either the rechargeable battery or with a backup battery system based upon the first sensor value; control the illumination level of the plurality of LEDs in the first and the second lamp head based upon first sensor value; connect and disconnect the rechargeable battery to the remote photovoltaic module based upon the first sensor value; wherein the first sensor value is based upon rechargeable battery.

In other implementations, the outdoor security light may further include a second sensor providing a second sensor value, the security light controller further operable by instructions stored in the associated memory, to: read the second sensor value; control the illumination level of the plurality of LEDs in the first and the second lamp head based upon the second sensor value; wherein the second sensor value is related to an ambient temperature. In other aspects, the security light controller may further be operable by instructions stored in the associated memory, to control the illumination level of the plurality of the LEDs in the first and the second lamp head based upon a third sensor value, wherein the third sensor value is read by the security light controller from a third sensor. Other implementations may also include a sensor value which is based upon the backup battery system.

In lighting units such as those that include LED-based light sources, it is desirable to have control over one or more light sources of the lighting unit. For example, it may be desirable to control which of one or more light sources/LEDs are illuminated and/or to control one or more lighting parameters of one or more of the light sources. For example, it may be desirable to control color, color temperature, intensity, power consumption, beam width, and/or beam direction of light output provided by one or more LED-based light sources of an LED-based lighting unit.

As used herein for purposes of the present disclosure, the term "LED" should be understood to include any electroluminescent diode or other type of carrier injection/junction-based system that is capable of generating radiation in response to an electric signal and/or acting as a photodiode. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" or "illumination source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

The term "lighting fixture" or "security light" is used herein to refer to an implementation or arrangement of one or more lighting units in a particular form factor, assembly, or package. The term "security light" is used herein to refer to an apparatus including one or more light sources of same or different types. A given unit may have any one of a variety of mounting arrangements for the light source(s), enclosure/housing arrangements and shapes, and/or electrical and mechanical connection configurations. Additionally, a given unit optionally may be associated with (e.g., include, be coupled to and/or packaged together with) various other components (e.g., control circuitry) relating to the operation of the light source(s). An "LED-based security light" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
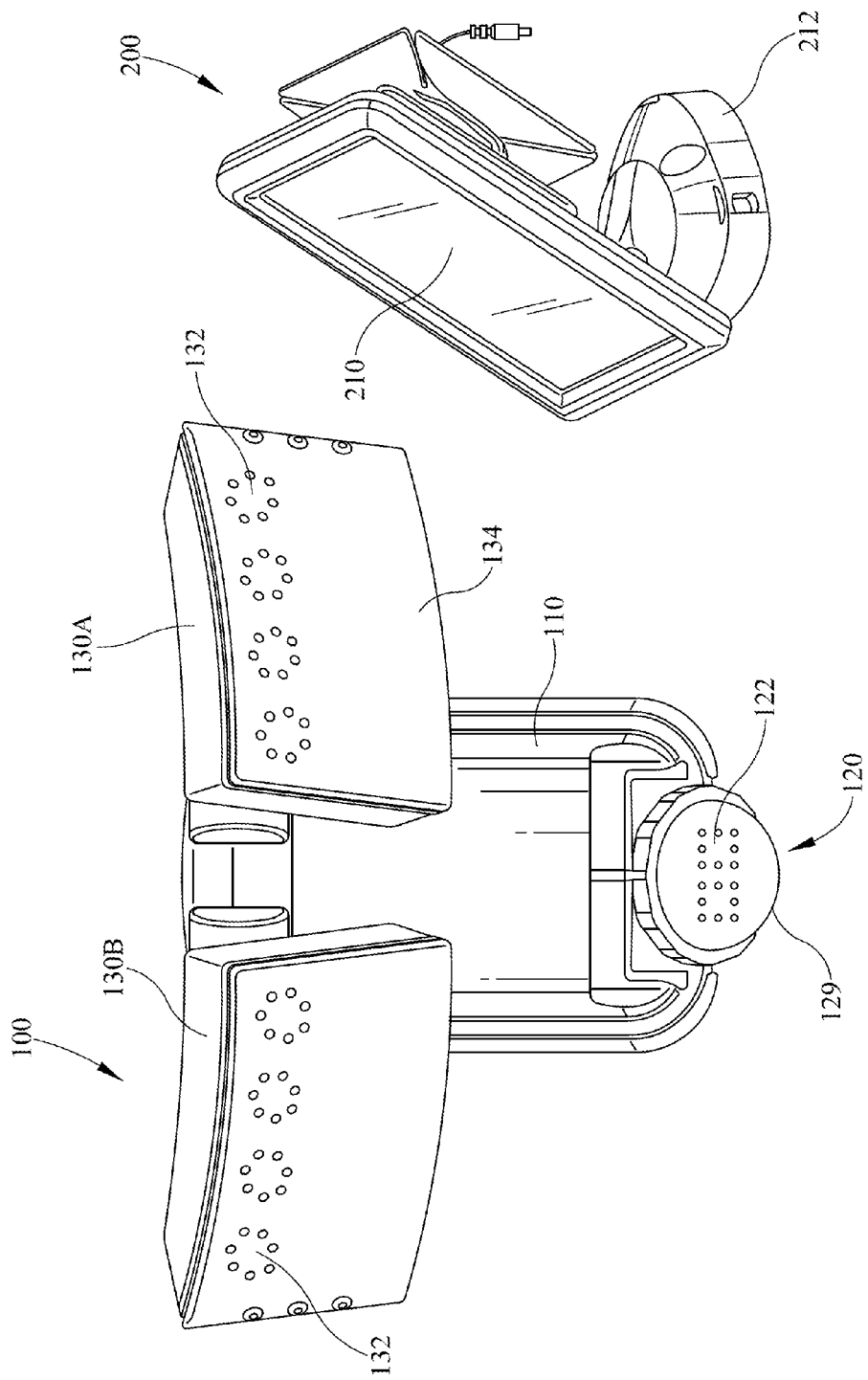
FIG. 1 illustrates an example security light having a remotely placeable photovoltaic module as described herein.

In outdoor security lighting, it may be desirable to have a security light which can provide power for illumination directly from the security light itself and not be directly connected to a standard electrical line due to costs, location and other circumstances. The security light may be positioned in a place where there is no access to standard line voltage, costs associated with extending standard line voltage to the location for the security light may be prohibitive, electrical code requirements may prevent installation of line voltage in the area as well as other factors. Thus it is desirable to have an operational security light which activates higher intensity light for area illumination upon the detection of movement without the need to wire the light into the main electrical feed of the residence or commercial establishment.

This disclosed security light set forth herein includes motion or proximity detection sensors in order to detect movement such that the area may be illuminated upon detection of such movement. This illumination may be wider area illumination from the light sources and may be variable depending upon the power source which is being utilized as well as other environmental conditions. Thus, for example, if the rechargeable batteries are being utilized by the load, the illumination level may be a first illumination level. If the backup batteries are being utilized by the load, a second illumination level such as, for example, a lower level may be utilized as compared to the first illumination level. For example, the first illumination level may be 600 lumens and the second illumination level may be 200 lumens. Even further and in alternative embodiments, the security light may operate at a first dusk illumination level to provide low level illumination, say at dusk, for a predetermined period of time. The security light may also operate at a second higher illumination level upon detection of movement, the higher illumination level further operable for a predetermined period of time after such detection of movement and also may be variable depending on battery source being utilized as noted herein. Further, the security lighting units described herein within the various embodiments may incorporate exterior light level sensors in order to adequately determine the external light conditions, keep the illumination sources extinguished when it is sufficiently light outside while also allowing the rechargeable batteries to be recharged by the remote PVM.

In security lighting units such as described in the various embodiments, power may be applied by virtue of a remotely placeable photovoltaic module which provides electrical power to recharge batteries of the security light while also, in various embodiments, being positioned remotely of the security light housing in order to maximize sunlight which may not be directly impinging upon the security light. By remotely placing the module, such solar power can be maximized regardless of positioning of the security light and the module can be used to continually recharge the rechargeable battery system thereby not requiring the security lighting unit to be connected to a main electrical feed. As well, the security light may have an integrated backup battery system for use when the rechargeable batteries have insufficient power.

Such a security light system can take advantage of LEDs which have significantly less power requirements than typical incandescent illumination systems thereby extending the life of the rechargeable battery system while also providing sufficient illumination levels to adequately illuminate areas after detection of movement.

In lighting units such as those that include LED-based light sources, it may be desirable to have control over one or more light sources of the security lighting unit to ensure that the current load on the rechargeable battery system is sustainable. For example, it may be desirable in various embodiments to control which of one or more LED light sources are illuminated and/or to control one or more lighting parameters of one or more of the light sources. For example, it may be desirable to control intensity, beam width, and/or beam direction of light output provided by one or more LED-based light sources of an LED-based lighting unit while independently providing power to the illumination sources.

Thus, Applicants have recognized and appreciated a need in the art to provide methods and apparatus that enable a security light system which has its own electrical power source and a security light controller that optionally overcomes one or more drawbacks of existing apparatus and/or methods noted herein.

More generally, Applicants have recognized and appreciated that it would be beneficial to provide various inventive methods and apparatus related to providing an independently powered security light system having a remote PVM while also functioning as a standard security light having both a reduced lower and increased higher intensity light output level from one or more light sources based on motion detection and current external light conditions.

In view of the foregoing, various embodiments and implementations of the present invention are directed to security lighting control and the utilization of a remote photo-voltaic module to generate sufficient electricity to power the security lighting unit and/or recharge the rechargeable battery system.

In the following detailed description, for purposes of explanation and not limitation, representative embodiments disclosing specific details are set forth in order to provide a thorough understanding of the claimed invention. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatus and methods may be omitted so as to not obscure the description of the representative embodiments. Such methods and apparatus are clearly within the scope of the claimed invention. For example, aspects of the methods and apparatus disclosed herein are described in conjunction with a security light unit having a housing and having one or more light heads with various illumination sources. However, one or more aspects of the methods and apparatus described herein may be implemented in other units that have alternative configurations. For example, aspects described herein may be implemented in security light units wherein the illumination sources and/or other components are not enclosed in a housing. Also, for example, aspects described herein may be implemented in units wherein power may be provided to one or more of the components of the security light unit through various electrical connections that are not engageable with a standard illumination sources. Implementation of the one or more aspects described herein in alternatively configured environments is contemplated without deviating from the scope or spirit of the claimed embodiments.

FIG. 1 illustrates an example of a security light system 100 with a remote photovoltaic module 200 which may provide security lighting at a remote location. The security light 100 incorporates, in this example, a first lamp head 130A and a second lamp head 130B, which are adjustably mounted onto the security light housing 110. The security light housing 110 further includes at least one motion detector 120 which may include a sensor 122 protected by a lens 129 such that detection of motion, within a detection range, triggers the security light 100 to place the LEDs 132 into a high-intensity or high-illumination mode.

The security light lamp heads 130A/130B may have a plurality of LEDs 132, each may be individually addressable by a security light controller 123 of FIGS. 10A-10D. The LEDs may be positioned within the lamp heads and may be any of a number of configurations, color, intensity level and the like and may be directly controlled by the security light controller thru LED drivers or other associated electronics. Covering each of the lamp heads 130A/130B may be a lens 134 in order to protect the LEDs 132.

Additionally, to provide power to the security light system 100, a remote photovoltaic module (PVM) 200 may be mounted adjacent to or associated with the security light housing 110, such that the PVM may be remotely positioned from the housing 110. It may be necessary to remotely position the PVM 200 since the security light housing 110 may be mounted underneath a roofline, eaves, or other area not directly within the direct sunlight. The remote PVM 200 thus is remotely connectable to the security light housing 110 by virtue of the power transfer cord 216, shown in FIGS. 2 and 3 which may be utilized to energize the rechargeable battery contained within the housing upon operable selection by the controller.

Figure 4:
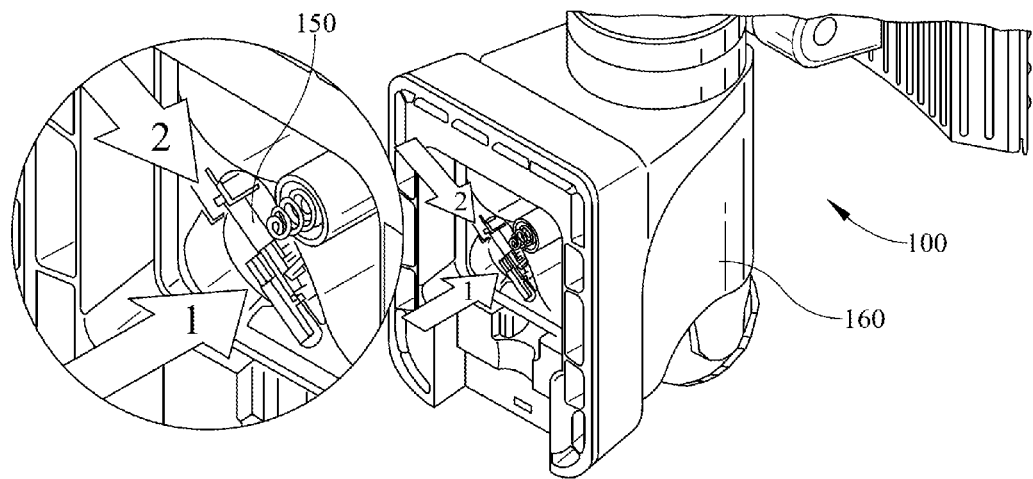
FIG. 4 illustrates the rechargeable battery system of the example lighting unit of FIG. 1.

The photovoltaic cells 210 within the remote PVM 200 should be positioned at a location to maximize direct sunlight for the conversion of the sunlight to electricity and such that the remote PVM 200 can adequately charge the rechargeable batteries 150 within the security light housing 110 (see FIG. 4). Such positioning may be adjacent to the housing or may be sufficiently distanced from the housing to ensure such sunlight exposure. The cells 210 may cover an area, for example, 100-300 cm2 depending on the load, energy conversion level and other factors. Various other conditions may directly affect the overall size of the PVM in order to generate sufficient power form the cells to recharge the battery and power the LEDs.

The remote PVM 200 may be mounted by virtue of the remote PVM mount 212 and may be adjustable such that it appropriately captures adequate sunlight dependent upon geographic location and mounting position.

Figure 2:
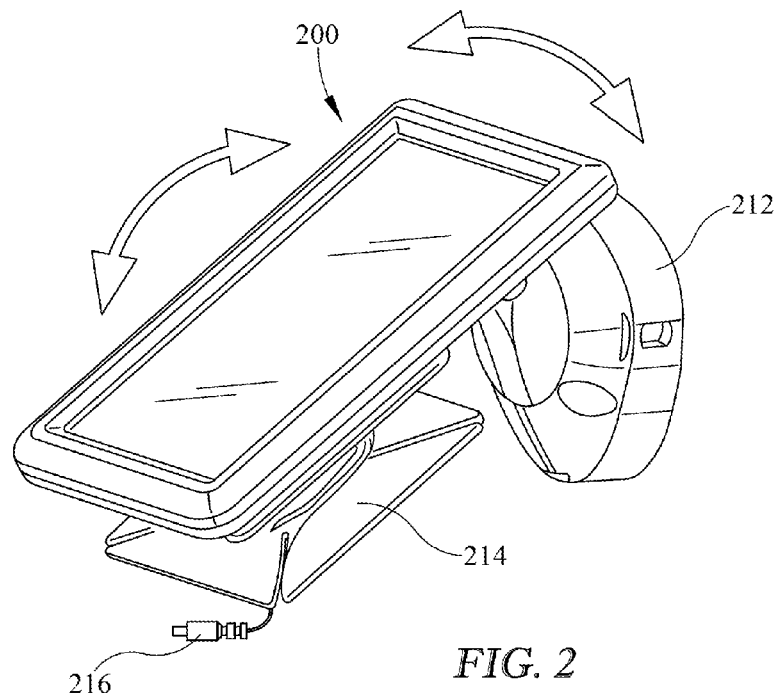
FIG. 2 illustrates an exemplary remotely placeable photovoltaic module.
Figure 3:
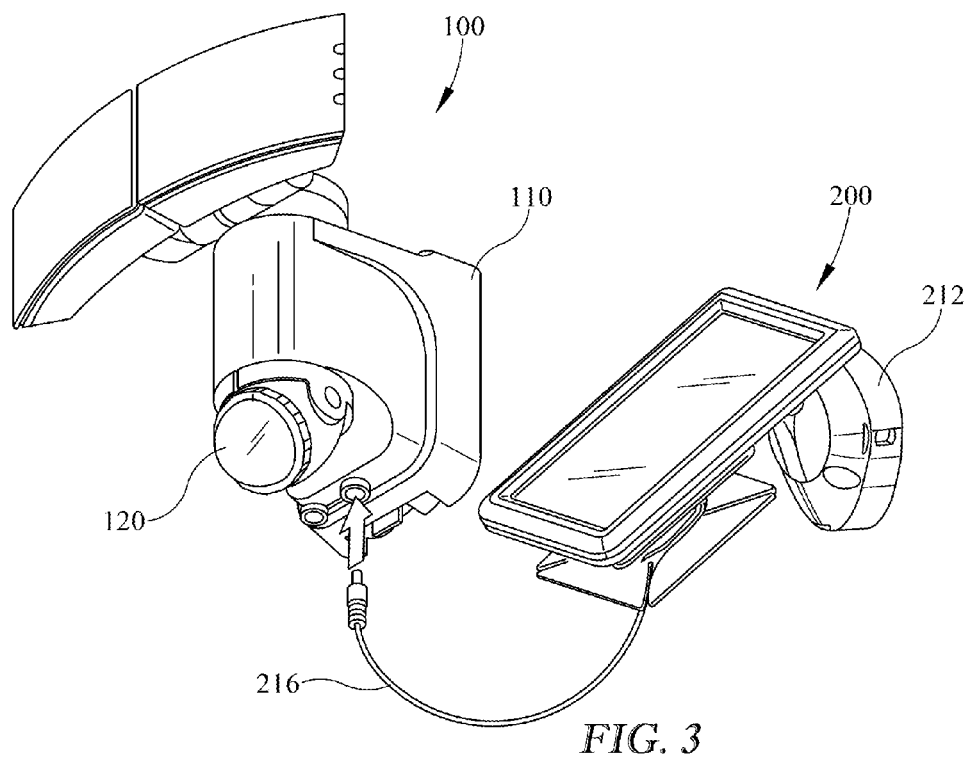
FIG. 3 illustrates an exemplary security lighting unit connected to the remote module as described herein.

As shown in FIG. 2 and in FIG. 3, the remote PVM 200 may swivel appropriately relative to the mount 212 so that it adequately captures sufficient light to appropriately recharge the rechargeable battery to power the security light 100 and the LEDs 132. The power transfer cord 216 may be retained by the cord management stand 214 and then plugged into the housing and a power supply circuit 171 such that electricity generated by the remote PVM 200 is utilized to recharge the rechargeable batteries 150 contained within the controller housing 160, shown in FIG. 4. As depicted in FIG. 3, the remote PVM 200 is electrically connected to the power supply circuit 171 such that the security light controller 123 can control the recharging of the rechargeable battery 150, dependent upon operating conditions of the security light and other factors. The power transfer cord 216 as depicted in FIG. 3, may be removably attachable to the security light housing and power supply circuit as depicted or, may be directly secured and attached thereto. The remote PVM 200, however, may be remotely positioned and mounted by virtue of the mounting stand 212 such that the remote PVM 200 is adjacent to, but not necessarily affixed with, the security light housing 110.

As is further depicted in FIG. 3, the motion/proximity detector 120 may, in various examples, be positioned along a lower section of the security light housing 110 so that it may be adjustably positioned relative to the housing and aimed towards high traffic areas. The motion/proximity detector 120 may include at least one sensor 122 and in some instances, two sensors in order to increase accuracy and depth perception. The sensors may include a PIR (infra-red passive) sensor that detects a heat source for activation of an alternative higher-intensity light output level for the security light 100 and thus wide area illumination. The PIR of the motion detector may also be combined with a Fresnel lens and other structures to focus light and/or radiation to the opening allowing input to the senor electronics.

Figure 10A:
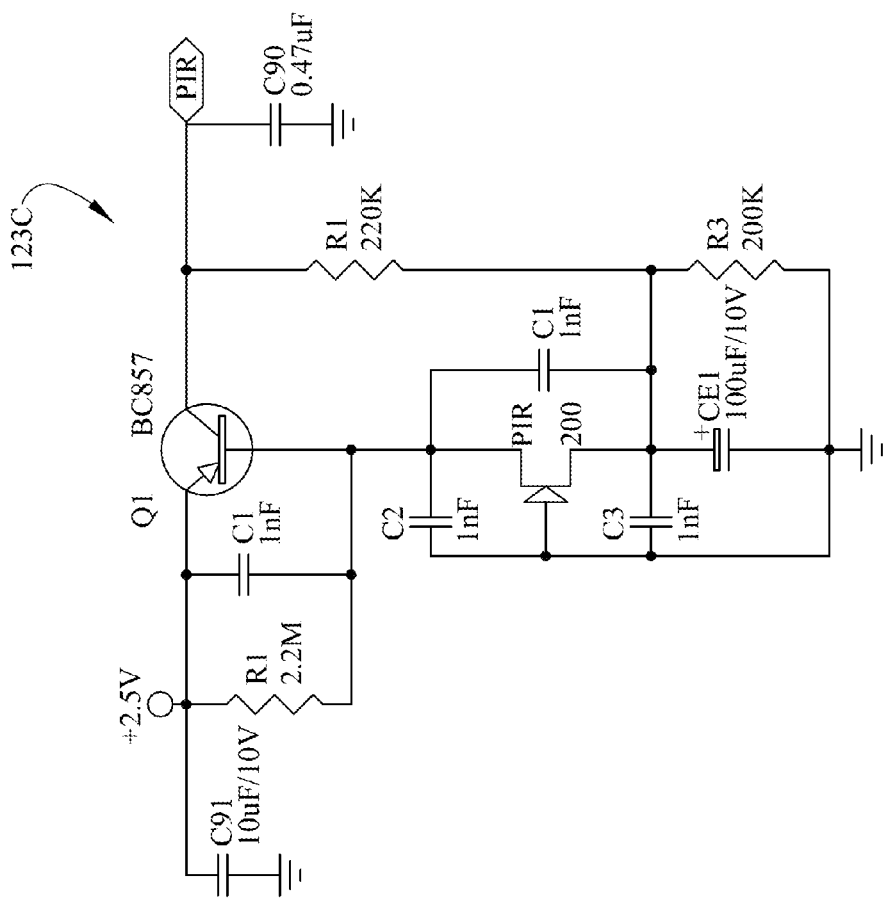
FIG. 10A illustrates an exemplary circuit diagram to implement a motion detection sensor circuit as part of the control system of the security light described and shown herein.
Figure 10B:
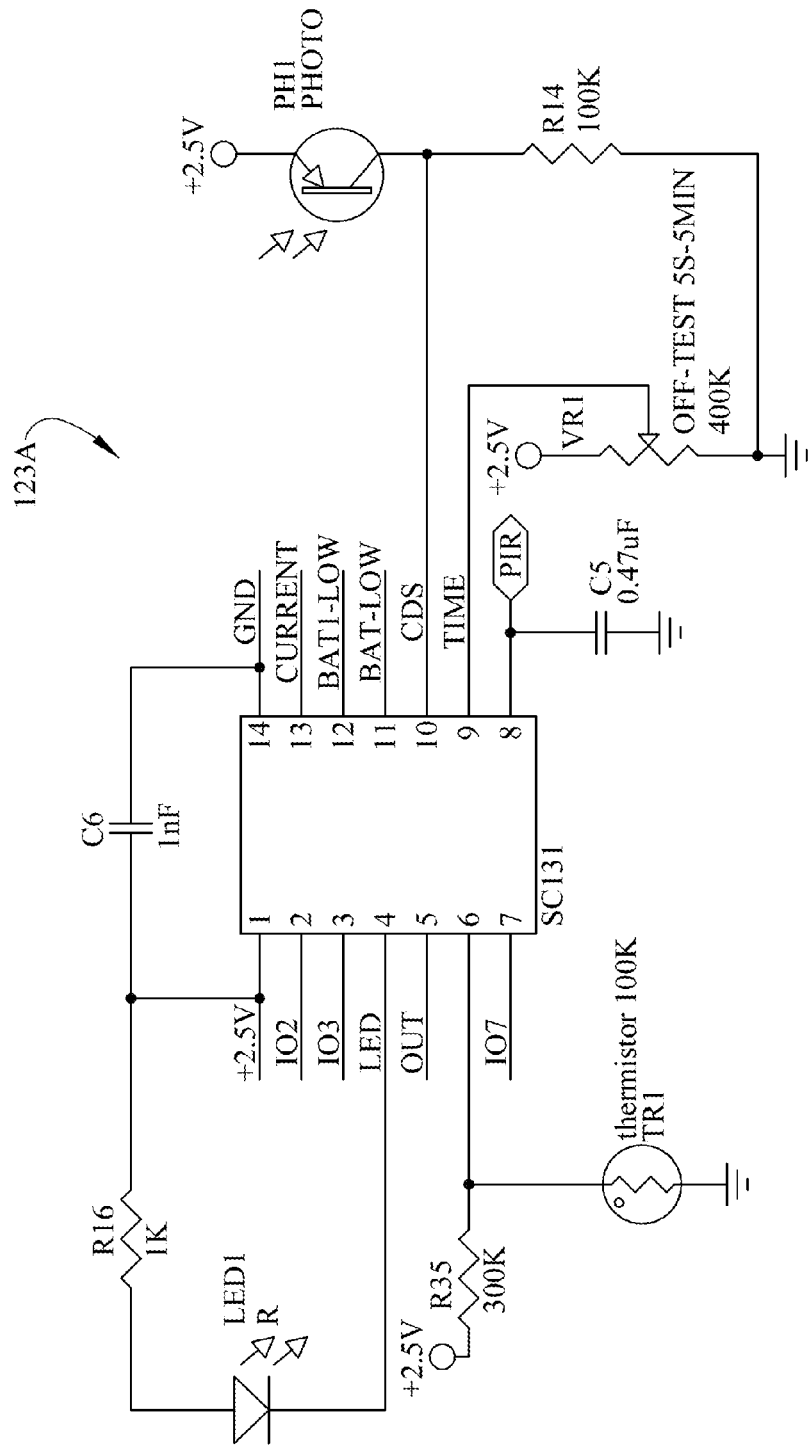
FIG. 10B illustrates an exemplary circuit diagram to implement a security light controller circuit as part of the control system of the security light described and shown herein.
Figure 10C:
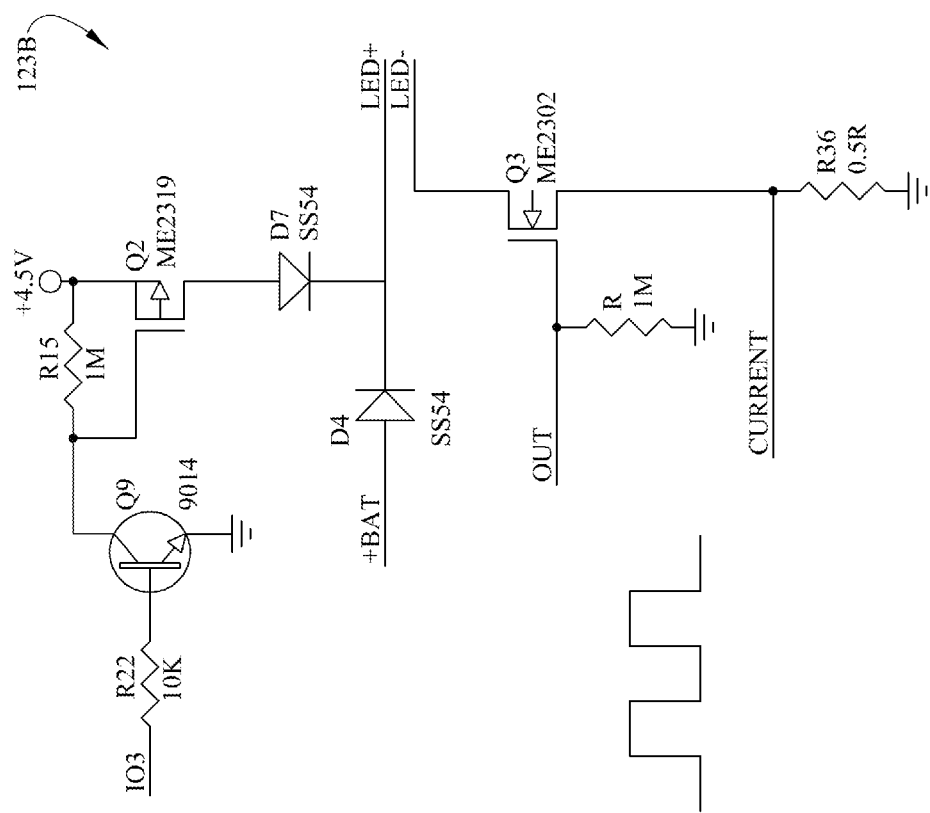
FIG. 10C illustrates an exemplary circuit diagram to implement a pulse width modulation (PWM) control circuit as part of the control system of the security light described and shown herein.
Figure 10D:
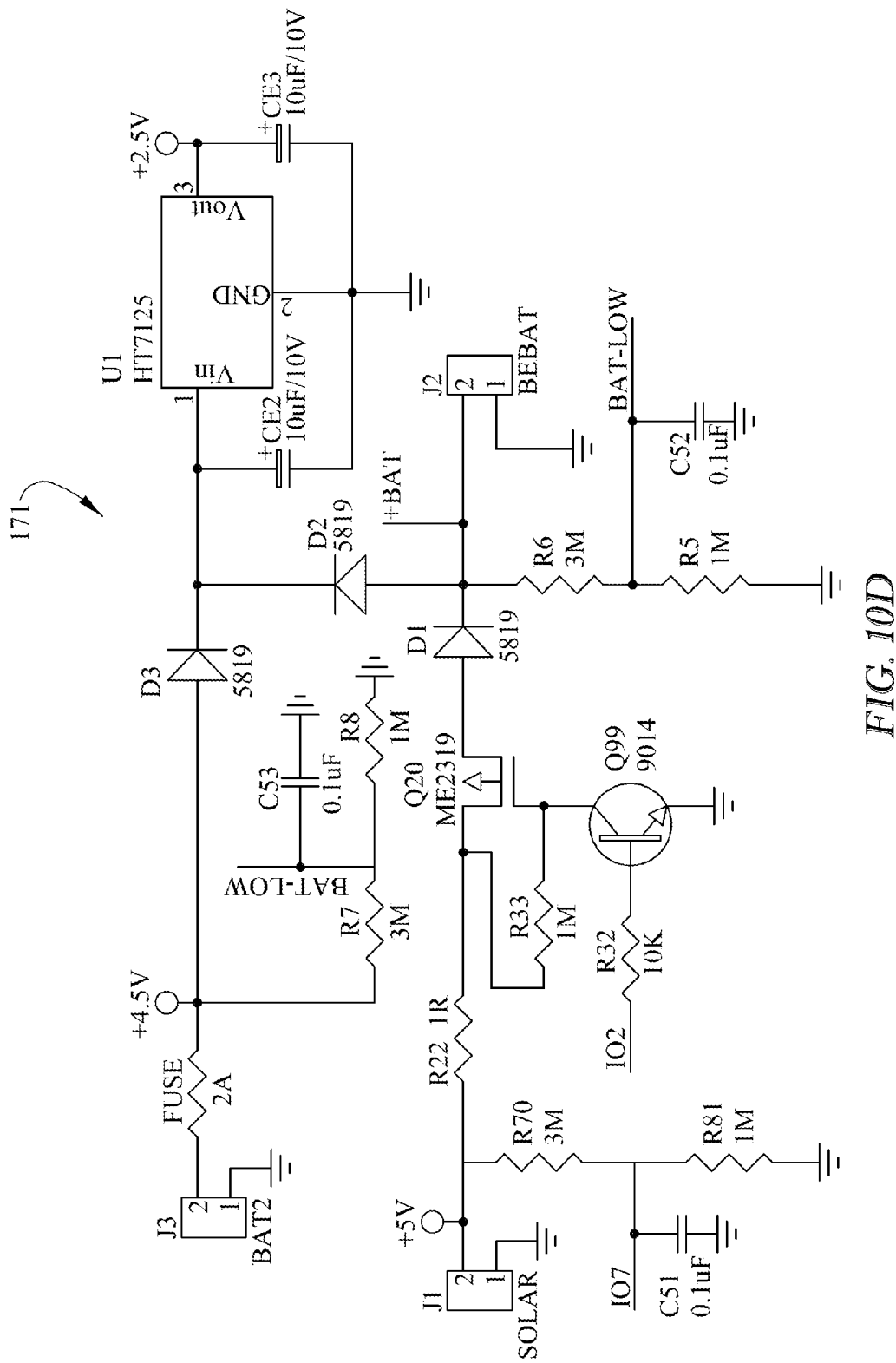
FIG. 10D illustrates an exemplary circuit diagram to implement a power supply circuit as part of the control system of the security light described and shown herein.

Motion detector 120 provides sensor output that may be utilized by the controller 123 and the PIR sensor circuit 123A of FIG. 10A to determine presence of a user and/or other object within a threshold distance of the detector 120. In some embodiments the motion sensor 122 output may be a true/false output that indicates presence and/or non-presence of a user and/or other object within a threshold distance of the sensor. For example, in some embodiments the sensor output may be a "true" value (e.g., a first voltage) when a user and/or other object is within a threshold distance of the sensor and may be a "false" value (e.g., a second voltage or no voltage) when a user and/or other object is not within a threshold distance of the sensor. In some embodiments the sensor output may include more than two values. For example, each value may indicate an estimated distance of the nearest user and/or other object and the controller 123 may utilize the value to determine if the estimated distance satisfies a threshold distance. Alternatively the sensor may include a plurality of sensors used to determine and filter false positives or regulate sensed input. Also, for example, each value may indicate a likelihood that a user and/or other object is within a threshold distance of the proximity sensor and the controller 123 may utilize the value to determine if the likelihood satisfies a threshold likelihood.

The motion detector 120 may include one or more apparatus that utilize one or more techniques to provide output that may be utilized by the controller 123 to determine presence of a user and/or other object within a threshold distance of the detector 120. The detector 120 may include one or more components that may be coupled to and/or embedded in one or more components of the security lighting unit 100 such as a heatsink of the lighting unit 100, a bulb type housing of the lighting unit 100, or other functionally related component. In some embodiments the motion detector 120 may be coupled to and/or embedded in an outer periphery of the lighting unit 100 or in a location that enables transmission and/or receipt of signals through a light exit window or lens 129 of the lighting unit (e.g., a transparent or translucent bulb type housing).

For example, in some embodiments the motion detector 120 may be a capacitive sensor that utilizes a heatsink of the lighting unit 100 and/or a transparent patch of indium tin oxide (ITO) on an outer surface of the lighting unit 100 as a key. Also, for example, in some embodiments the motion detector 120 may be an ultra-sonic Doppler transmitter and receiver that uses time of flight techniques to determine distance to an object. Also, for example, in some embodiments the detector 120 may be a radar transmitter and receiver that uses time of flight techniques to determine distance to an object. Also, for example, in some embodiments the motion detector 120 may be an infra-red reflection distance sensor receiver that measures distance to an object. Also, for example, in some embodiments the detector 120 may include an infra-red passive sensor (PIR) that detects a heat source (such as a user's hand). Also, for example, in some embodiments the detector 120 may be light reflection sensor that detects presence and/or distance of an object based on reflections of light output of the illumination sources 132. Also, for example, in some embodiments the detector 120 may be a camera and one or more signals from the camera may be utilized to detect presence and/or distance of an object. For example, signals from a depth camera may be utilized to determine an object in the shape of a person or vehicle is approaching. Also, for example, signals from a camera may be utilized to determine movement and the movement may be assumed or determined to be human movement. Also, for example, signals from a camera may be utilized to determine presence of a heart beat for example, by monitoring changes in reflected light from a hand and/or other body part of a user. In some embodiments a proximity sensor may include one or more controllers to determine presence, distance, and/or other values. In some embodiments controller 123 may additionally and/or alternatively determine presence, distance, and/or other values based on motion detector input provided by the motion/proximity detector 120.

In some embodiments, any threshold distance utilized by the motion detector 120 and/or the controller 123, and/or a detection range of the sensor 122 may be set to a distance so that false positives are minimized. For example, in some embodiments a threshold distance and/or a range of the motion detector 120 may be set to less than 35 ft. or may be a minimum and maximum range of both outward distance and rotational or coverage angle.

As described herein, in some embodiments the security light 100 may integrate the motion detector 120, the security lighting controller 123, the light sources 132, and the housing 110 in a cohesive package. In other embodiments one or more of the sensor 122 or motion detector 120, the controller 123, and/or the housing 110 may be provided separate from the lamp heads 130A/130B. For example, the controller 123 may be provided remote from the security light unit and may be in communication (e.g., wired or wireless communication) with the motion detector 120, the lamp heads 130A/B, and/or a drivers for the LEDs 132.

The remote PVM 200 depicted in the figures and in the various examples, may further include in some aspects a power collection and supply system 171 which collects solar power and delivers it through an isolation diode, for example through the power supply circuit 171 and to the rechargeable battery 150. The security light controller may control the connection of the remote PVM 200 to the rechargeable battery in order to control recharging and current flow thereto. Various known technologies in circuitry are provided for the converting of the solar power to the appropriate voltage necessary for recharging the rechargeable batteries and may further include a power converter and over-voltage protection circuit. For example, in some embodiments it may include resistor-zener diode shunt regulators and other resistors and diodes to protect the various circuits from high voltages potentially produced from the solar cells under high-light conditions. For example, in some embodiments, voltage converters may be provided to convert the voltage to an appropriate range to supply power to the various recharge and power supply circuits contained within the controller housing 160 or elsewhere.

The remote PVM 200 may incorporate, as indicated, photovoltaic cells 210 of sufficient size in order to recharge the batteries in order to appropriately power the LEDs 132 of the lamp heads 130A/130B and power the associate controller electronics and sensors. The battery and power supply is sized sufficiently in order to provide high-intensity light output when motion is detected from the motion/proximity detector 120. For example, in various embodiments, an arrangement of solar cells having an area of about 200 $cm^2$ and a standard or average efficiency of 16% may create 12 watt-hours of electricity which can be stored in the rechargeable battery 150 on a day having 4 hours of sunlight. Depending upon the configuration of specific LEDs 132, and considering the number of times the system is activated by the detector 120 for high-intensity light output, the system may allow for activation of high-intensity light output up to 15-30 times a night which may utilize approximately 4 watt-hours. Battery storage requirements may be sufficient to appropriately store 12 watt-hours or more, even with successive non-sunny days.

Figure 5:
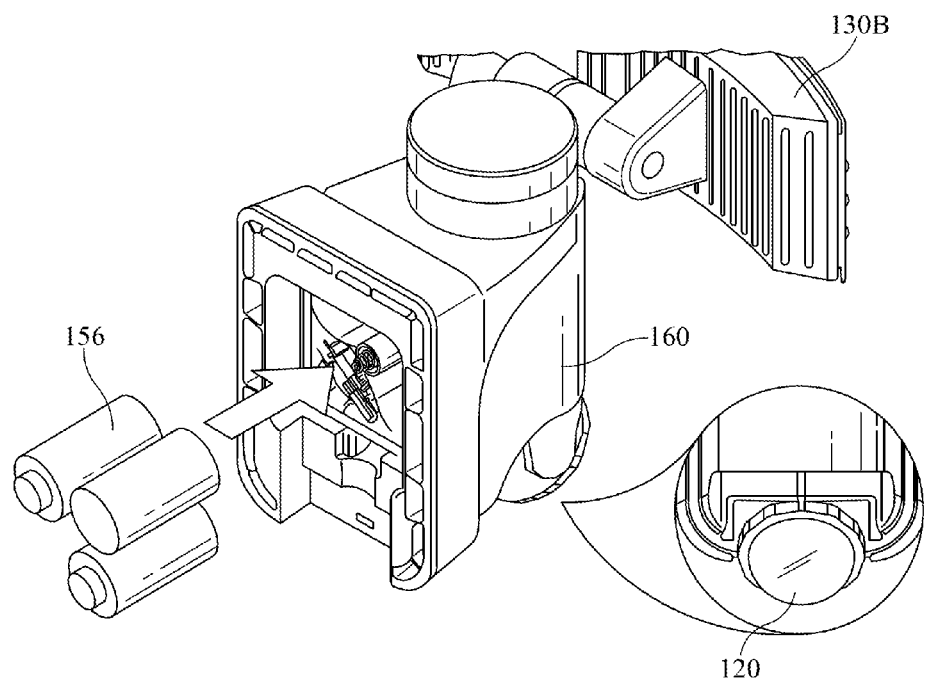
FIG. 5 illustrates the backup battery system of the example security light of FIG. 1 with the motion detector shown.
Figure 6:
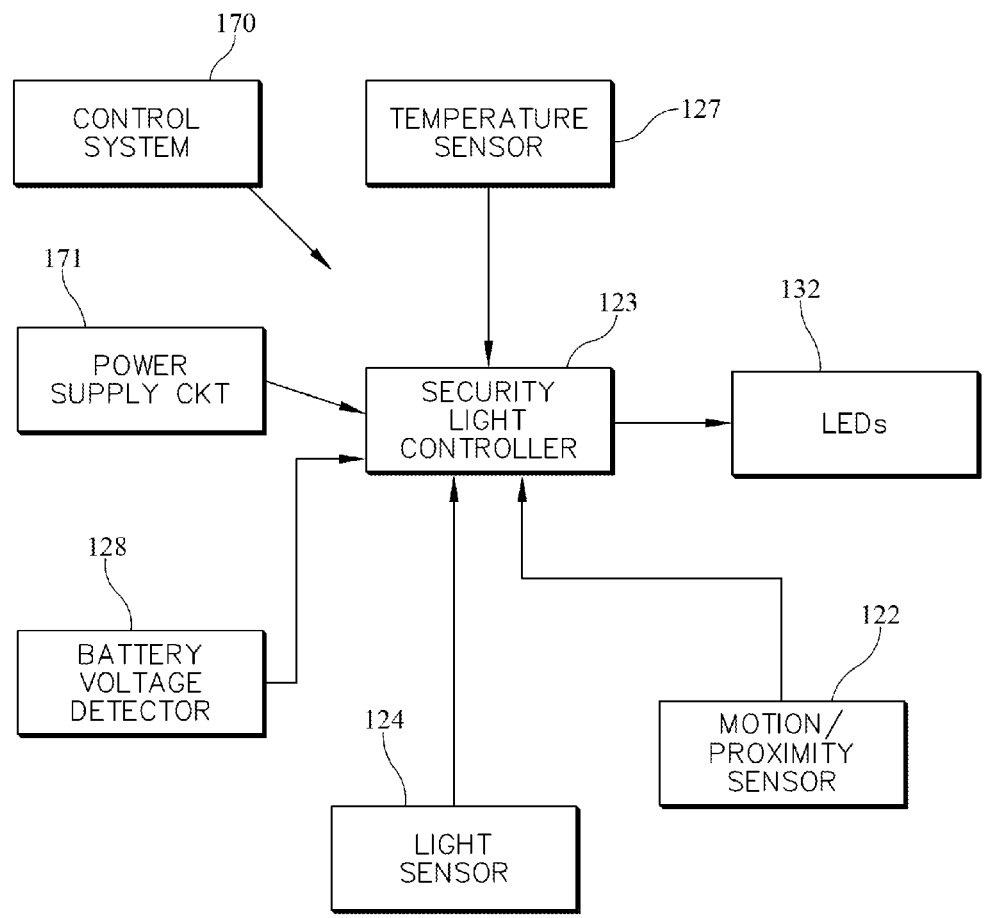
FIG. 6 illustrates a block diagram of an embodiment of the security light having a remotely placeable module.

As shown in FIGS. 4 and 5 a rechargeable battery 150 may be connected to the power supply circuit 171 contained within the controller housing 160 and which may be in various embodiments controlled by the security light controller 123, depicted in the block diagram of FIG. 6. The power supply circuit may or, in other embodiments may not be incorporated within the controller 123 depending on the overall configuration and requirements of the electronics for the security light system. In some embodiments, the supply circuit may simply be a switch or other device operably connecting and disconnecting the electrical input from the remote PVM to the rechargeable battery. In other embodiments, the power supply circuit may be directly integrated within the security light controller for control of the electrical flow path between the remote PVM and the rechargeable battery. In still other embodiments, the power supply circuit may be integrated electronics which operably connect either of the rechargeable battery or the backup battery to the load, the load being the illumination sources and other electronics. In various configurations, the security light controller may integrate such power supply components and logic within the controller, associated with the controller or in separate functional components to achieve the same operable connectivity and electronic supply of power to the various components of the system.

For example, in various embodiments in order to supplement the rechargeable battery 150, a battery backup system 156 may be included and operably connected to the power supply circuit 171 and associated electronics or controller. The battery backup system 156 may in various embodiments be standard alkaline batteries or other power storage source, which are inserted into the controller housing 160 or kept in close proximity thereof for use when the rechargeable battery 150 has insufficient power to appropriately energize the LEDs 132 of the security light and other load factors.

For example, in some embodiments, the power supply circuit 171 can include various relays including a multi-pole relay, forward diodes, opto-isolators, p-channel JFET, transistor or other circuit that would allow transfer of power supply from one source to another based upon an input signal from the controller or based upon sensor input signals. Many other options are available for such power supply circuit whether integrated within the controller or separated therefrom in a distinct functional circuit or separated components.

Thus, the security light 100, in some embodiments, incorporate both a rechargeable battery system for primary energy storage, which is electrically connected to the remote PVM 200, and may further include a battery backup system 156 for those instances where too low of voltage is detected from the rechargeable battery 150 for the load or demand or a combination of factors as detected by the control system or individually determined.

For example, in some embodiments, if the LEDs 132 of the at least one lamp head for the security light 100 are powered by the non-rechargeable batteries of the battery backup system 156, a reduction in light output may be provided and initiated by the security light controller 123 and power supply circuit 171. For example, in some embodiments, in order to reduce the light output and limit the power draw and thereby increase the battery life of the standard battery backup system 156, pulse width modulation may be sufficiently modified at a MOSFET gate Q3, depicted in FIG. 10C of a PWM control circuit 123B, in order to appropriately reduce the power to the LEDs. Various pulse with modulation techniques may be implemented by virtue of the security light controller 123 and associated LED drivers and circuits such that battery life may be extended by both the battery backup system 156 and, as well, to the rechargeable battery 150, under certain conditions. For example, pulse width modulation may be fixed at 500 Hz by the security light controller 123 and PWM control circuit 123B by detection of various external environmental conditions, such as temperature detected by a temperature sensor 127, such as a thermistor. Thus, the duty cycle may be appropriately adjusted in order to not only increase or decrease the illumination intensity level of the LEDs, but also in order to extend the battery life of both the rechargeable battery 150 and the battery backup system 156, dependent upon detected sensor input.

Duty cycle modification may be utilized in many implementations for purposes other than reduction or increased intensity level of the illumination and pulse width modulation is only one possible implementation of such control. Frequency modulation or other modulation schemes and control functions are available to modify output, reduce energy consumption of the load and further extend battery life.

For example, in some embodiments as depicted in FIG. 6, a block diagram is provided as an embodiment of the security light elements, including a security light control system 170 which may include the security light controller 123, temperature sensor 127, power supply circuit 171, battery voltage detector 128, light sensor 124, as well as motion/proximity sensors 122. The security light controller 123 of the security light control system 170 may be in electrical connection to the individual LEDs 132 and thereby directly addresses the individual LEDs in the separate lamp heads or may address them all in unison or in any desired segment. Various LED drivers may be incorporated within the LEDs or as necessary, within the security light controller or other displaced electronics.

In some embodiments the control system may include control circuit 123A, PWM control circuit 123B, motion detector PIR sensor circuit 123C and power supply circuit 171, depicted in FIGS. 10A, 10B, 10C and 10D. Such exemplary circuits however are depicted as one of many possible implementations and various components, functional features, inputs and other design aspects may be combined, added, removed or replaced as needed or as requirements and functional implementations dictate.

In further aspects, the LEDs 132 may be white LEDs or may be a combination of colors in order to generate white light as is typical in security lighting function. Color, brightness, direction and other control may be implemented through the security light controller 123.

In some embodiments the LEDs 132 are driven by one or more drivers and the controller 123 communicates with the one or more drivers to control the LEDs 132. In some embodiments the controller 123 may form part of the driver for light sources. In some embodiments, such as those where the controller 123 is provided remote from the LEDs, the controller 123 communicates with one or more local controllers of the security lighting system 100 to control the illumination or light sources 132. For example, a plurality of local controllers may be provided, each controlling one or more sources 132 of the lighting unit 100. In some embodiments the controller 123 itself may include a plurality of local controllers, each controlling one or more sources 132 of the unit 100. Embodiments including multiple controllers may optionally incorporate wired and/or wireless communication between the multiple lighting controllers.

In some embodiments the light sources 132 may include a plurality of LED groupings each including one or more LEDs. One or more aspects of the control of each of the LED groupings may optionally be specific to the individual LED grouping. For example, the intensity, color, beam width, and/or beam direction of one or more LED groupings may be individually controlled. For example, the controller 123 may only reduce the intensity of the light output one or more LED groupings based on a determined sensed input condition, while maintaining the intensity of the light output of one or more other LED groupings. Also, for example, the security light controller 123 may apply lighting adjustments responsive to input via the various detection inputs to one or more LED groupings during a predefined adjustment condition such as motion detected, battery voltage, temperature and the like, while maintaining one or more other LED groupings at a reduced or extinguished light output intensity during the sensed condition or environmental detected status.

For example, in embodiments, a temperature sensor 127 may provide temperature input for external ambient temperature to the security light controller within the control system 170 and may be any known temperature sensing device which provides an electrical signal detectable by the controller 123, such as a thermistor.

A power supply circuit 171 may also be provided within the control system 170 in order to appropriately connect and disconnect the various battery source, namely the backup battery 156 or the rechargeable battery 150 and may also work in conjunction with the security light controller 123, or by itself, to connect or disconnect the rechargeable battery 150 from the remote PVM 200 based upon the preset condition of the rechargeable battery 150.

Each of the batteries in various implementations, the rechargeable battery 150 and the battery backup system 156, may also be in electrical communication with a battery voltage detector circuit 128 of the control system 170 and power supply circuit 171, such that the security light controller 123 is able to determine the current output voltage of the various power supplies. Various known voltage detection circuits may be implemented either remotely or integrated with the associated electronics of the control system 170 in order to provide signal input to the security light controller 123 representative of the voltage level at the various power supplies. Further, other known techniques may be utilized as opposed to voltage detection as is known, such as constant current, power or resistance measurements.

As well, for example in some embodiments, the motion/proximity sensors 122 may be electrically connected to the security light controller 123 such that an electrical signal or communication is received or detected by the security light controller 123 in order to modify the light output upon a detection signal from the motion/proximity detector. Standard operation of a security light typically indicates that high-illumination levels will be implemented for a user-defined period of time upon detection of movement within a field of view, the field of view being the area detectable by the motion sensors in a direction in which the lens/detectors are pointed. Such range can be as little as 35 feet and up to 100 feet and be in an arc up to 240°, dependent upon the various corresponding electronics, components and circuits utilized. Known systems may be implemented in order to reduce the false triggers of motion, as well as preventing retriggering by implementation of a delay circuit.

Figure 7:
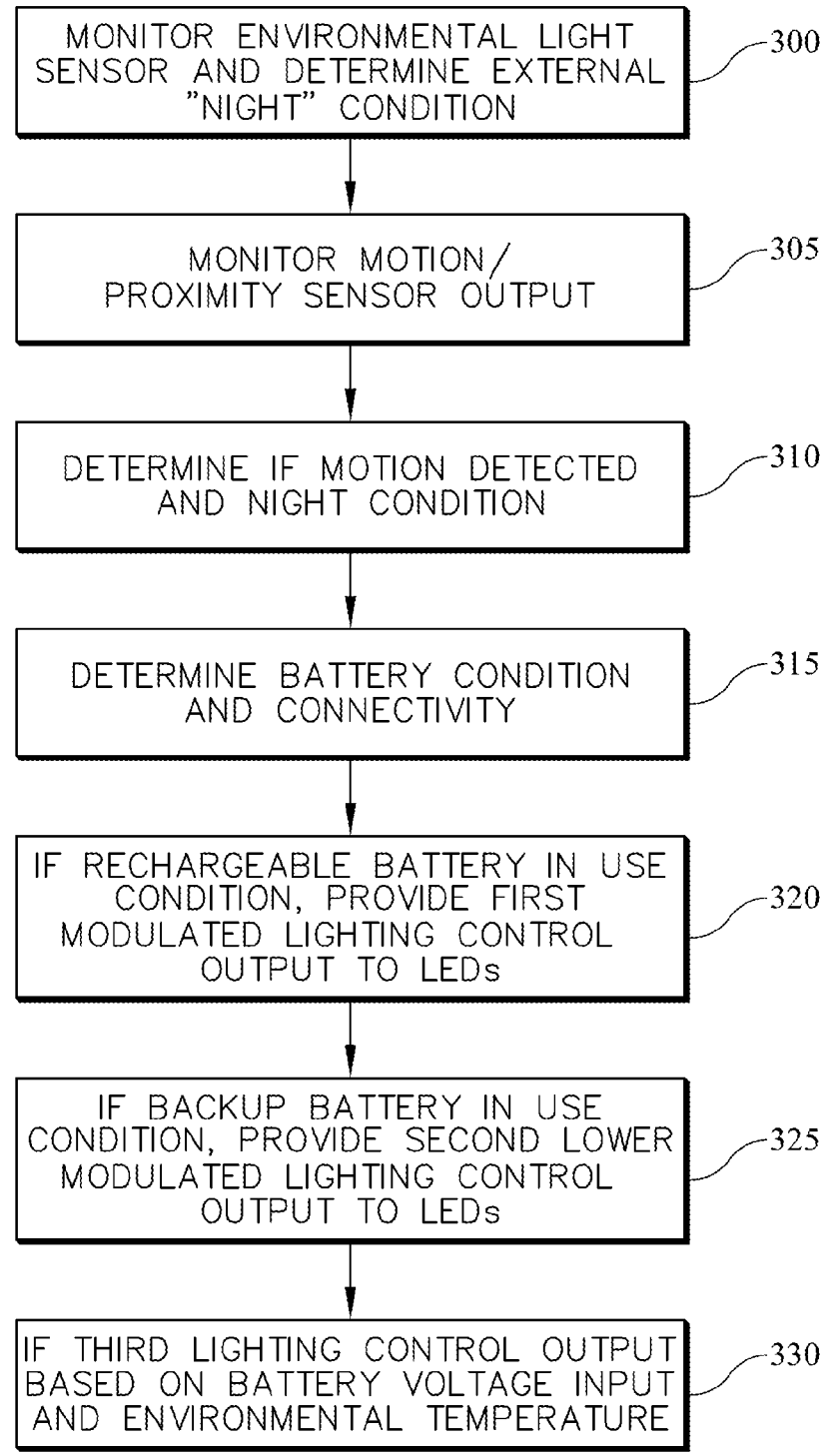
FIG. 7 illustrates a flow chart of an example method for the security light controller.

As shown in FIG. 7, one example for normal operation of a security light depicted may include the lighting controller providing light output signals to operate one or more of the LEDs once motion is detected. Initiating a valid 'motion' detected signal however, the security lighting unit 100 may monitor an environmental light sensor 124 which may be positioned on an exterior of the housing. Thus, at step 300, the controller will monitor the light sensor to determine if a 'night' condition presently exists. If the controller determines a night condition is present, determination of illumination and light control output signal generation will be conducted.

Alternatively and in various implementations, a dusk setting low level output may be determined such that the security light emits light at a low-intensity after the light sensor 124 detects a low environmental light condition, such as the setting sun. The low-intensity level light output from the lamp heads 130A/130B may be maintained for a predetermined and set amount of time defined by the user and adjustable therewith based upon user input.

At step 305, the security light controller may monitor the motion/proximity sensor in order to determine whether or not a motion condition has occurred. The monitoring of the motion detector via the output line of the motion/proximity sensor can be restricted so that it is only monitored while a valid night condition is present. The controller then may determine if both a night condition and a valid motion detection condition is present at step 310 in order for the controller to initiate determination of light output signals.

The controller may determine, at step 315, the current battery condition for both batteries or for only the battery which is currently connected to the load. Such determination can be by polling voltage or other power indication signals from the power supply circuit, direct signals sent from the battery supplies, voltage or current monitoring and the like, any of which may suffice to provide signal input to the controller indicative of the battery condition. This may also include a system storage setting as to which battery is presently connected to the load. Further, the system may, at step 315 or as part of a parallel or additional process, continually determine and execute the various steps of monitoring the rechargeable battery conditions for continued connection of the rechargeable battery to the remote PVM, as outlined in FIG. 8.

If a motion condition has occurred and the controller determines that the rechargeable battery is currently in use, the security light controller at step 320 will determine a first lighting control output for the LEDs and signal adjustment based upon the motion/proximity sensor input. the first lighting control output may be a modulated signal to control the output duty cycle of the LEDs such that a higher intensity output is allowed due to load being connected to the rechargeable battery. The first lighting control output can be, for example, 600 Lumens and can be implemented by the controller as a control signals to the LED drivers or may be a command signal sent to LED drivers which drive light output.

Each of the systems outlined in the various implementations may include code segments and/or instructions stored in memory that are accessible by a processor, each of the code segments individually operated depending on the various sensor inputs.

For example, in some alternative constructions and implementations, if day-time condition exists, only aspects of the recharging circuit and implementations may be executed. Further, if night-time conditions are detected, charging aspects of the method outlined herein may be bypassed and only voltage level detection and other systems may be polled.

At step 325, if the backup battery is currently in use, the security light controller will determine a second lighting control output which may be less than the first lighting control output. The second lighting control output could be, for example, a percentage of the first lighting control output or can be a modified value representing a duty cycle which is reduced based upon battery condition. For example, in some embodiments, the rechargeable battery first lighting control output can be set at 600 lumens and the backup battery second lighting control output can be set at 200 lumens.

Also, in some embodiments, concurrently or periodically, the battery voltage or other representative signal may be polled such that the security light controller receives the battery voltage or battery status input of either the rechargeable battery 150 or the backup battery.

In some embodiments, at step 330, the security light controller may determine a third lighting control output based on the battery voltage or battery status input or alternative sensor input in order to select the appropriate light output level dependent upon such modified or degraded status. The input can be an input voltage signal or some other signal indicating battery condition or other environmental condition. The input can be a temperature input representative of environmental conditions. In various embodiments, these conditions could result in the controller implementing a further reduced output for the unit to preserve or lengthen battery life. For example, at step 330, the security light controller may determine that given the current battery status or other input, an alternative third lighting control output may be used to control LED intensity. In some aspects, if the security light controller detects a condition for the rechargeable batteries, wherein the rechargeable batteries are at a voltage level sufficiently close to but not below a lower threshold value where the rechargeable batteries may be disconnected from the load, the security light controller may reduce the light output intensity level of the LEDs 132 through modulation or other techniques in order to conserve battery life.

Alternatively, staged reductions in the duty cycle of the LEDs may be implemented as the load continually drains the battery for extended periods. The controller may gradually modify the light output level depending upon such staged reductions and determinations in order to periodically step the illumination intensity down may be implemented in order to preserve the battery life during operation of either the rechargeable battery or the backup battery system. Determination of battery health may be detected in terms of the voltage of the batteries but many alternative battery health detection methods may be implemented.

Figure 8:
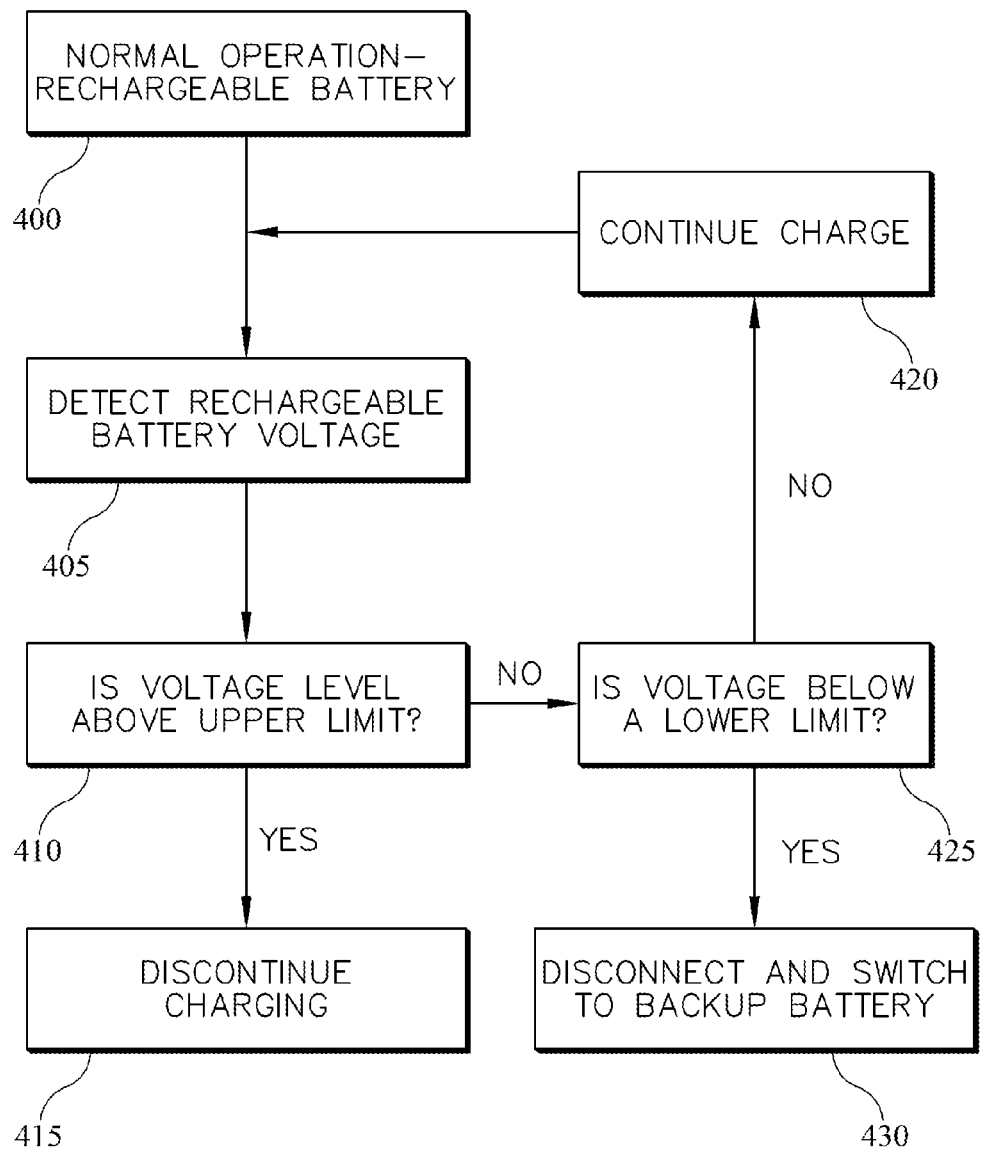
FIG. 8 illustrates a flow chart of an example of the method for normal operation of the security light for operation and recharging of the batteries.

As depicted in FIG. 8, during normal operation 400 of the security light 100 on the rechargeable batteries, the control system 170 may allow continued charging of the rechargeable batteries at step 420 by detecting and monitoring the rechargeable battery voltage at step 405. If, for example, the rechargeable battery voltage is above a predefined upper limit, such as 4.2 volts, the control system 170 may disconnect the remote PVM 200 from the rechargeable batteries at step 415 in order to discontinue charging. If such upper limit is not detected at step 410, the control system may further determine whether or not the rechargeable battery voltage is below a lower limit, such as 3.4 volts. If the voltage detected from the rechargeable batteries is below the lower voltage limit as determined at step 425, the control system through the security light controller, in some examples, may utilize a power supply circuit 171 in order to disconnect and switch the LEDs from the rechargeable batteries to the battery backup system. Alternatively, if at step 425, the controller determines that the voltage is sufficient and not below a threshold limit, the control system will allow continued charging of the rechargeable batteries. Such normal operation of the rechargeable batteries, at step 400, may extend the life of the rechargeable batteries while also protecting over-charging and/or over-use/over-load conditions.

Figure 9:
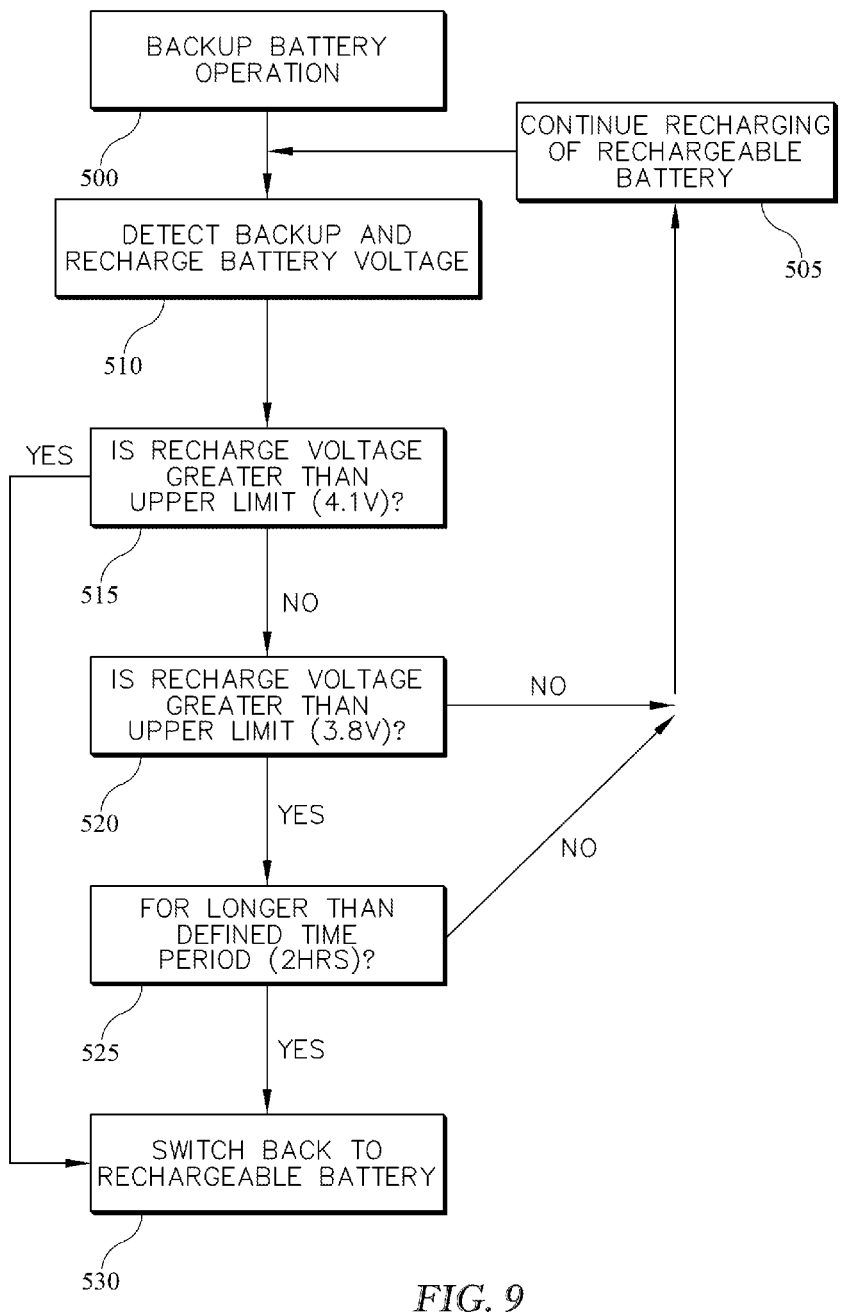
FIG. 9 illustrates a flow chart of an example of the method for backup battery operation of the security light for operation of the light on the backup batteries.

As shown in FIG. 9, process steps for the battery backup operation 500 are depicted while the control system allows for recharging of the rechargeable batteries, at step 505, during the powering of the LEDs and related electronics by the backup batteries. In various operations and examples, a mix of powering the LEDs or other illumination sources from one source while maintaining supply of the other electronics of the control system from an additional source may also be implemented. At step 510, the control system detects the backup battery voltage as well as the rechargeable battery voltage in order to appropriately control the LEDs and allow for recharging of the rechargeable batteries. If the recharge battery system voltage is greater than 4.1 volts, at step 515, the controller will automatically switch from the backup batteries to the rechargeable batteries as a sufficient recharge exists on the rechargeable batteries for operation of the load. Alternatively, if the rechargeable batteries are detected at below 3.8 volts, continued recharge of the battery will be maintained at step 505 while backup batteries are connected to the LEDs. Should the rechargeable batteries exhibit a voltage greater than 3.8 volts for longer than a predefined period, such as, for example, 2 hours, as detected at step 525, the system will automatically switch to the rechargeable batteries as indicated at step 530 to preserve backup battery systems. Alternatively, should the rechargeable batteries exhibit such higher voltage of a value greater than 3.8 volts, but for a shortened period of time, recharging of the rechargeable batteries may continue.

In some aspects, when the backup battery is in use and if the backup battery voltage is detected to be lower than approximately 3 volts, the backup battery may be disconnected from the LEDs and power supply circuit. An external LED or other user interface may be provided to visually indicate a low-battery voltage condition to the user.

Various other conditions, for example, may be implemented by virtue of the control system 170 utilizing the temperature sensor, voltage detection circuits 128, light sensors and other components thereof. Namely, external ambient temperature may affect not only the charging of the rechargeable batteries, but also the operation of the illumination sources. For example, if an ambient temperature is detected below −20° C. or a temperature above 45° C., the control system 170 may disconnect the rechargeable batteries and discontinue charging to preserve and/or protect the rechargeable system. For example, in some embodiments, if the ambient temperature is below 20° C. or above 55° C., the control system 170 may discontinue illumination of the LEDs by turning the lights off in order to prevent unsafe or high-drain conditions on the battery. For example, should the ambient temperature be between a predefined low temperature condition, such as, for example, between 0° and −10° C., the security light controller may adjust the duty cycle dependent upon the load and limit the load accordingly. Thus, for example, a duty cycle may be implemented at a predefined temperature of 0° to −10° C. at a first value to control the current, such as at 1500 mA or less. Alternatively, should ambient temperature be at a second value of between, for example, −20° C. and −10° C., the security light controller may adjust the duty cycle even further to control the current, for example, a value of 750 mA or less. The duty cycle may be fixed at, for example, 500 Hz and adjusted accordingly depending on such external conditions. By monitoring the ambient temperature during unusually cold conditions and modifying the duty cycle of the LEDs, significant drain on the batteries may be prevented due to the low ambient temperature.

The security light control system 170 may include and/or access a storage subsystem containing programming and data constructs that provide the functionality of some or all of the modules described herein. For example, the storage subsystem may include the logic to perform one or more of the process or system steps of the various figures. The modules implementing the functionality of certain embodiments are generally executed by security light controller 123, alone or in combination with other controllers (e.g., distributed processing). Memory may be used in a storage subsystem of security light control system 170 in combination with and accessible by the security light controller 123. Memory can include a number of memories including a main random access memory (RAM) for storage of instructions and data during program execution and a read only memory (ROM) in which fixed instructions are stored.

Referring to FIG. 7-9, a flow chart of exemplary methods of providing both a remote PVM with rechargeable battery and backup battery system for a security light is illustrated. Other implementations may perform the steps in a different order, omit certain steps, and/or perform different and/or additional steps than those illustrated in the Figures. For convenience, aspects of FIGS. 7-9 are described with reference to one or more system and security light components that may perform the method or aspects thereof. The components may include, for example, one or more of the components of security light 100 of FIG. 1 and/or one or more components of FIG. 6.

Exemplary circuit diagrams are provided in FIGS. 10A-10D of various implementation features and circuit elements which may be utilized in implementing the multiple components and process steps hereof. Many differing electronic implementations may be interchanged with the separate and detailed components and thus each element need not be limiting as they are provided as one of many possible implementations available to one of ordinary skill having the benefit of the present disclosure.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An outdoor security light with a remote photo-voltaic module, comprising:

a security light housing having at least one adjustable lamp head, the lamp head including a plurality of LEDs;

the security light housing including a control system, the control system having a security light controller;

a motion sensor in communication with the security light controller, the motion sensor adjustably attached to the security light housing;

a rechargeable battery contained within the security light housing and in electrical connectivity with the security light controller;

a backup battery contained within the security light housing and in electrical connectivity with the security light controller;

a remote photovoltaic module in electrical connection with the rechargeable battery and separately mountable from the security light housing;

the security light controller operably configured to optionally select connection between the remote photovoltaic module and the rechargeable battery based upon a first input parameter;

the security light controller further operably configured to electrically connect one of the rechargeable battery or the backup battery to the plurality of LEDs based upon at least the first input parameter.

2. The outdoor security light of claim 1 wherein the first input parameter is a rechargeable battery voltage signal from the rechargeable battery.

3. The outdoor security light of claim 2 wherein the security light controller is operably configured to monitor the first input parameter and disconnect the rechargeable battery from the remote photovoltaic module if it is above a predetermined upper threshold.

4. The outdoor security light of claim 2 wherein after the security light controller disconnects the rechargeable battery from the remote photovoltaic module, the security light controller is operably configured to monitor the first input parameter and reconnect the rechargeable battery from the remote photovoltaic module if it is below a predetermined first lower threshold.

5. The outdoor security light of 2 wherein the security light controller is operably configured to electrically disconnect the rechargeable battery from the plurality of LEDs and connect the backup battery to the plurality of LEDs when the first input parameter is below a second lower threshold.

6. The outdoor security light of claim 5 wherein the security light controller further is operably configured to disconnect the backup battery from the plurality of LEDs when a second input parameter is below a second lower threshold.

7. The outdoor security light of claim 6 wherein the second input parameter is a battery voltage signal from the backup battery and the second lower threshold is 3.0V.

8. The outdoor security light of claim 6 wherein the security light controller is operably configured to implement a staged reduction of a duty cycle of the plurality of LEDs as the second input parameter begins to lower.

9. The outdoor security light of claim 1 wherein the security light controller is operably configured to reduce a duty cycle of the plurality of LEDs as the first input parameter drops below a second input parameter.

10. The outdoor security light of claim 1 wherein the security light controller electrically connects the backup battery to the plurality of LEDs and reduces the intensity level of the plurality of LEDs as compared to a first intensity level when the plurality of LEDs are electrically connected to the backup battery.

11. An outdoor security light with a photo-voltaic module, comprising:

a first and a second lamp head, the lamp head, each of the first and the second lamp head having a plurality of LEDs, the plurality of LEDs electrically connected to a security light controller;

the security light controller in electrical connectivity with a motion detector, a rechargeable battery and a backup non-rechargeable backup battery;

a photovoltaic module in electrical connectivity with the rechargeable battery and which is separately mountable;

wherein the security light controller is operable to connect either the rechargeable battery or the non-rechargeable backup battery to the plurality of LEDs based upon a first input sensor value, the security light controller in electrical communication with a first input sensor to receive the first input sensor value;

wherein the first input sensor value is based on the rechargeable battery;

wherein the security light controller is in electrical communication with a second input sensor to receive a second input sensor value;

wherein the security light controller modifies the duty cycle of the plurality of LEDs based upon either the first input sensor value or the second input sensor value.

12. The outdoor security light of claim 11 wherein security light controller further is operable to electrically connect and electrically disconnect the rechargeable battery from the photovoltaic module based upon the first input sensor value.

13. The outdoor security light of claim 12 wherein the security light controller is further in electrical communication with a third input sensor, the security light control operable to receive a third input sensor value from the third input sensor.

14. The outdoor security light of claim 13 wherein the third input sensor is based upon temperature.

15. The outdoor security light of claim 14 wherein the security light controller is operable to electrically connect and disconnect the rechargeable battery from the photovoltaic module based upon either the third input sensor value or the first input sensor value.

16. The outdoor security light of claim 13 wherein the security light controller modifies the duty cycle of the plurality of LEDs based upon either the first input sensor value, the second input sensor value or the third input sensor value.

17. An outdoor security light with a remote photo-voltaic module, comprising:

a first and a second lamp head, each of the first and the second lamp head moveable relative to a security light housing and having a plurality of LEDs;

a motion detector;

a remote photovoltaic module in removable connectivity with a rechargeable battery, the rechargeable battery maintained within the security light housing;

a first sensor providing a first sensor value;

a security light controller in controlling electrical connection with the plurality of LEDs and having one or more processors with an associated memory, the associated memory having instructions stored thereon to:

read the first sensor value from the first sensor;

adjustably connect the plurality of LEDs in the first and the second lamp head with either the rechargeable battery or with a backup battery system based upon the first sensor value;

control the illumination level of the plurality of LEDs in the first and the second lamp head based upon first sensor value;

connect and disconnect the rechargeable battery to the remote photovoltaic module based upon the first sensor value;

wherein the first sensor value is based upon rechargeable battery.

18. The outdoor security light of claim 17 further including a second sensor providing a second sensor value, the security light controller further operable by instructions stored in the associated memory, to:

read the second sensor value;

control the illumination level of the plurality of LEDs in the first and the second lamp head based upon the second sensor value;

wherein the second sensor value is related to an ambient temperature.

19. The outdoor security light of claim 18 wherein the security light controller is further operable by instructions stored in the associated memory, to control the illumination level of the plurality of the LEDs in the first and the second lamp head based upon a third sensor value, wherein the third sensor value is read by the security light controller from a third sensor.

20. The outdoor security light of claim 19 wherein the sensor value is based upon the backup battery system.

\* \* \* \* \*